May 29, 1956  C. R. ROCHE  2,747,431
TRANSMISSION
Filed Oct. 13, 1950  4 Sheets-Sheet 2

INVENTOR.
CLIFTON R. ROCHE
BY
Burton & Parker
ATTORNEYS

United States Patent Office 2,747,431
Patented May 29, 1956

2,747,431
TRANSMISSION

Clifton R. Roche, Los Angeles, Calif.

Application October 13, 1950, Serial No. 189,981

25 Claims. (Cl. 74—765)

This invention relates to transmissions and particularly to an improved transmission and control thereof especially adaptable for use in motor vehicles.

An important object of the invention is to provide a transmission incorporating a simplified organization of parts which is easy and convenient to control and operate and which is composed of relatively few elements capable of being economically manufactured, assembled and maintained in efficient operating condition. Another important object of the invention is to provide an improved transmission including a hydrodynamic power transmitting device such as a fluid operated torque converter which enables the shifting operation to be performed without resistance from counterforces developed by the torque converter or other operating elements and does not require the vehicle to come to a stop in order to shift from forward to reverse and reverse to forward. A further important object of the invention is to provide an improved transmission and control system therefor which brings the shifting members of the transmission into synchronization before actual engagement and which governs the operation of the speed selector such that the shifting action is fully accomplished before the selected speed elements of the transmission perform their operation. As the shifting members are synchronized and are not under load during shifting, a fast and easy shift is provided.

An important feature of the invention relates to a transmission designed to rely solely on an engine driven pump for developing the operating fluid pressure and thereby eliminate the need of a pump driven by the vehicle wheels conventionally used in hydraulically controlled types of transmissions. In the present invention, the gear train of the transmission does not turn when the vehicle is towed and therefore does not require oil pressure to lubricate these parts. Moreover, the control units of the transmission do not require fluid pressure at the time the vehicle engine is started by a push applied to the vehicle.

Another feature of the invention is the use of the elements in the present transmission as a parking brake thereby eliminating costly mechanism for this purpose. Moreover, the braking element in the transmission is of the friction band type rather than a latch and tooth type now conventionally used. This eliminates severe shock loads and unpleasant bumps that are encountered by the use of the latch and tooth type when the parking brake is applied even at very slow vehicle speeds.

Another feature of the invention relates to the synchronizing clutch mechanism for coupling a driven shaft with the source of power and particularly the organization and relation of the parts of the mechanism to one another and the driven shaft. A shifting member is directly splined to the driven shaft for joint rotation and is selectively alternately engageable with internally toothed members of the clutch mechanism which surround the shaft in concentric radially spaced relation thereto. Associated with the mechanism are synchronizing elements of novel design which respond to the initial movement of the shift member and function to bring the member to the same speed of rotation of the selected toothed member before engagement therewith. Another object of the invention is to provide such a synchronizing clutch mechanism that is relatively inexpensive to manufacture. The novel arrangement of parts allows the elements of the synchronizer to be turned inside out as compared with conventional types, thereby providing all of the elements, except one, with internal teeth. Such internal teeth can be cut with one broaching operation which is very much more economical than cutting all the internal teeth required for conventional type synchronizers.

Another feature of the invention relates to the control system for the transmission and the manner in which it governs the action of the parts to assure that no load is placed on the shifting member and associated synchronizing elements when a change of transmission speed or direction is initiated. The control system is preferably hydraulic and one of the important features of the invention is a novel control mechanism which is so designed that it will move both the shift member and a selector valve but in such a sequence that the shift action is completed before the valve admits the fluid under pressure to the speed and directional control elements of the transmission.

Another feature of the invention relates to the structural arrangement of the parts in the transmission unit. Incorporated in the unit are two brake band encircled drums which are coupled to separate elements of a planetary gear assembly. The brake bands and the peripheral portions of the drums with which they are grippingly engageable are located over journal bearings and so arranged that the brake reaction is directed to the transmission case instead of the gear train mechanism and thereby eliminates deflection or distortion of the gear train parts. One of the bearings encircles the synchronizing clutch mechanism and serves as a journal mounting therefor.

Another important feature of the invention is the provision of a novel hydraulic system which utilizes the engine oil and the oil pump associated with the engine for furnishing the fluid pressure for controlling the operation of the transmission.

Various other objects, advantages and meritorious features of the invention will become more fully apparent from the following specification, appended claims and accompanying drawings wherein:

Fig. 9 is a longitudinal sectional view of the selector valve device illustrating operating positions of the valve differing from that shown in Fig. 3, Fig. 12 is a fragmentary sectional view taken along line 12—12 of Fig. 11.

*General description*

Figure 1:
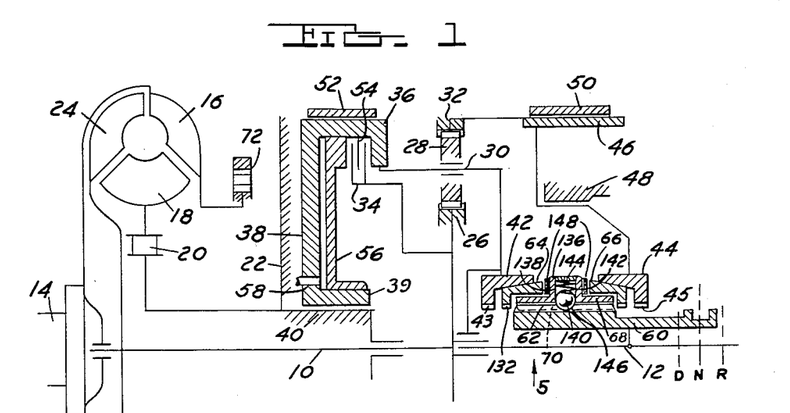
Fig. 1 is a diagrammatic view illustrating the major components of a transmission unit constructed in accordance with the present invention.
Figure 2:
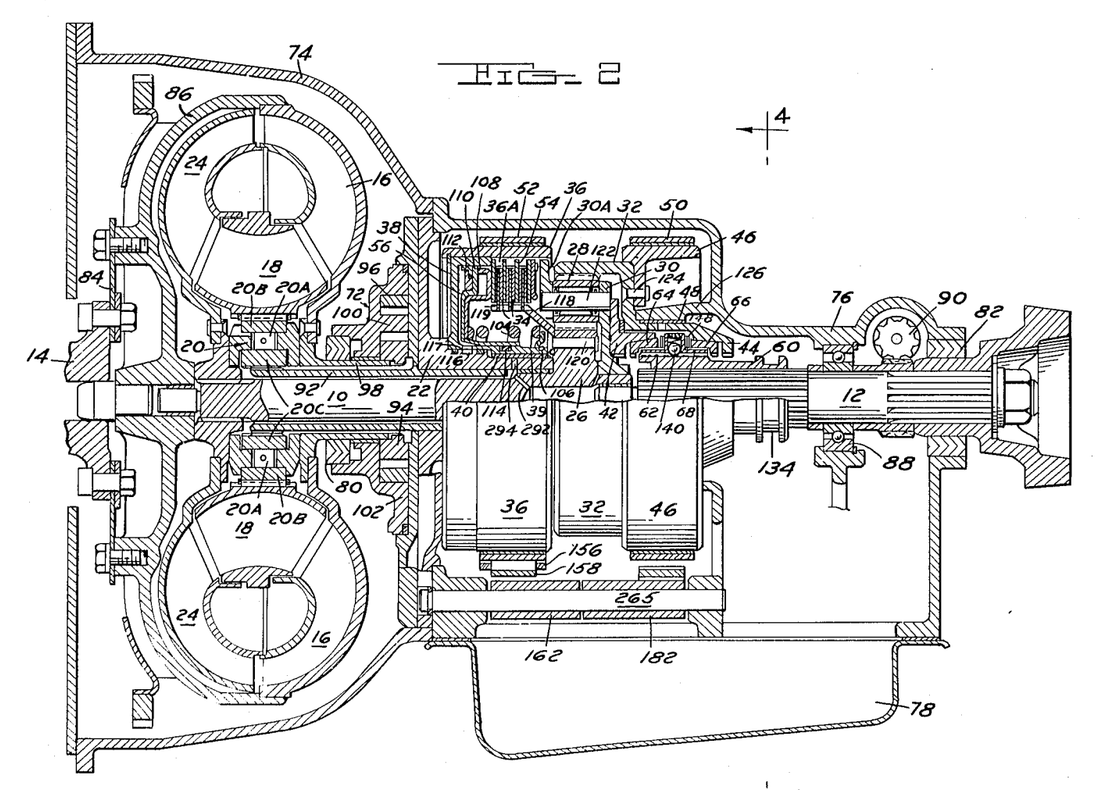
Fig. 2 is a view, principally in longitudinal section, of a transmission unit incorporating the features of the present invention.
Figures 3, 4, 5, 8:
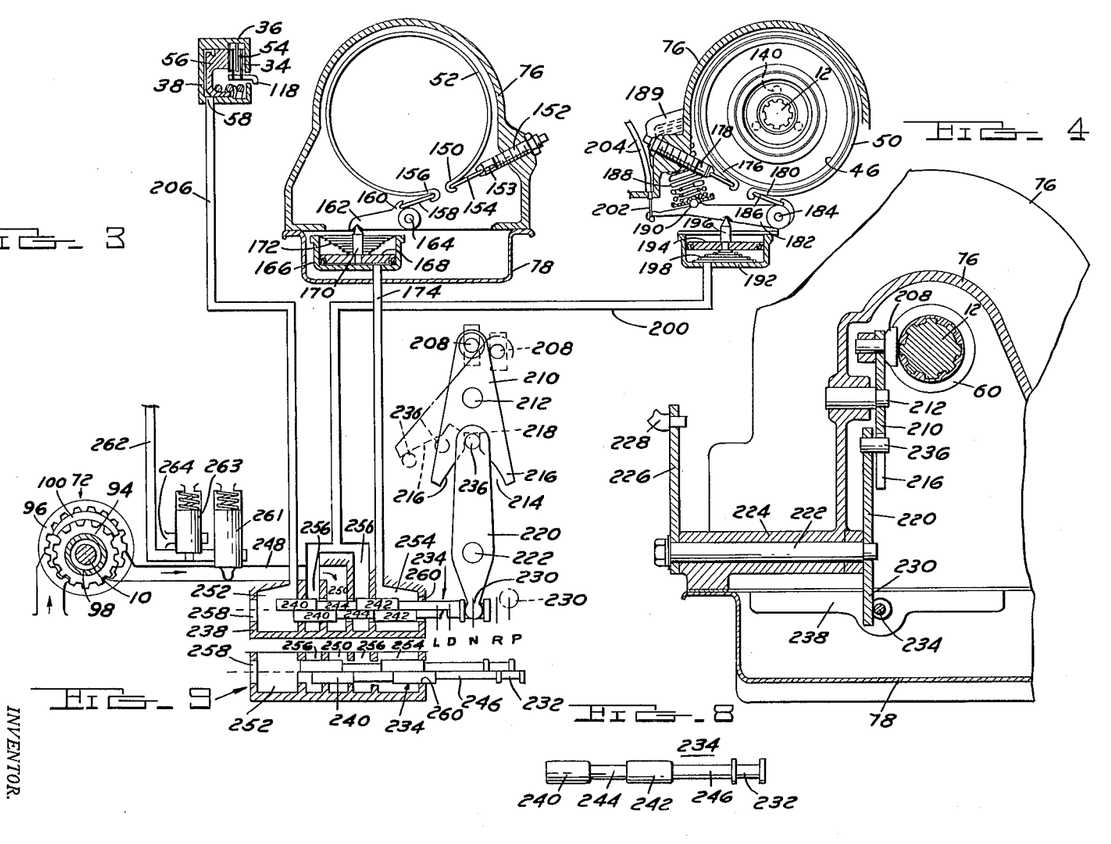
Fig. 3 is a schematic view illustrating the control system for the transmission unit and showing in displaced relation certain operating elements of the transmission.
Fig. 4 is a sectional view taken in the plane of line 4—4 of Fig. 2 and showing the mounted relation of certain control elements illustrated in Fig. 3.
Fig. 5 is a fragmentary view of certain elements of the synchronizer clutch mechanism, shown distorted into one plane for purpose of clarity, and taken in the direction of the arrow 5 in Fig. 1 but with a portion of the shift member cut away to more clearly show the construction of other members behind the same.
Fig. 8 is a side elevation of the selector valve.
Figure 5:
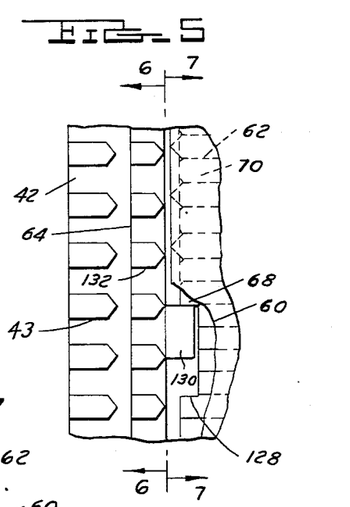
Figures 10, 11, 13:
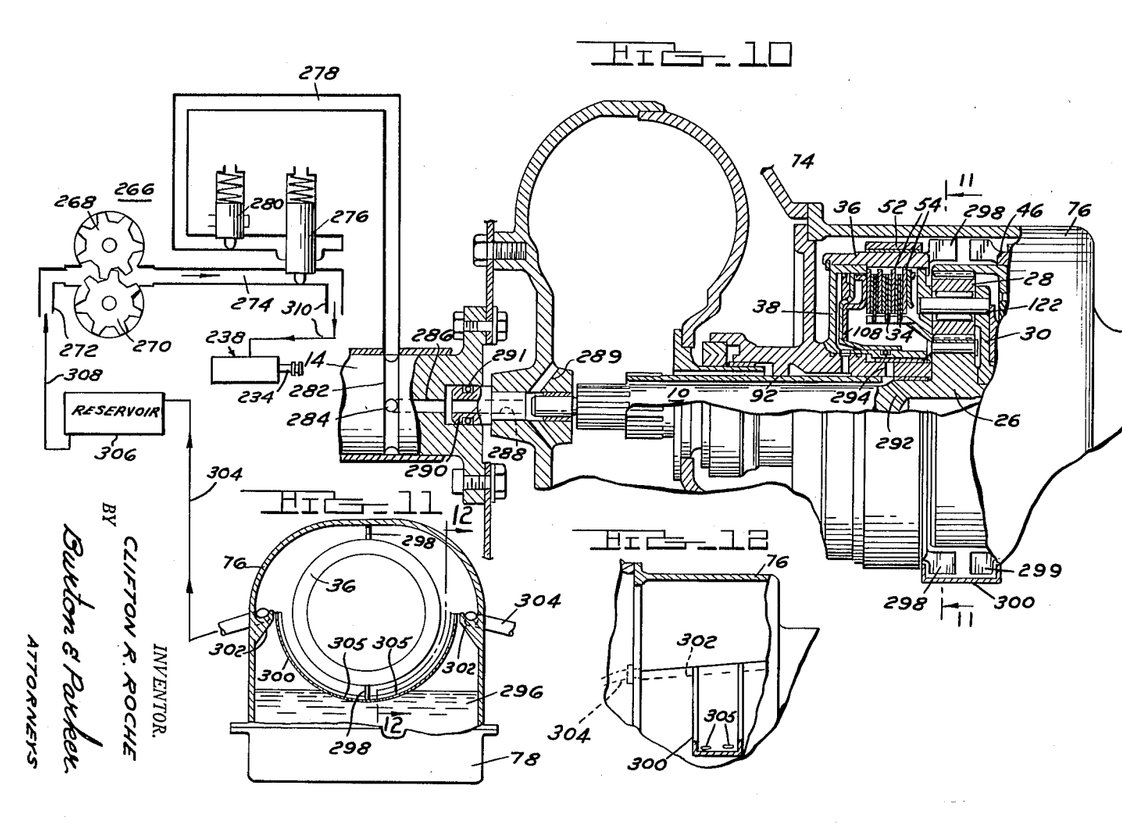
Fig. 10 is a fragmentary view of a modification of the transmission showing the same principally in longitudinal section and diagrammatically illustrating a modification of the invention employing the engine oiling system for the hydraulic control means of the transmission.
Fig. 11 is a cross sectional view taken along 11—11 of Fig. 10 and illustrating means for preventing rise of oil above a predetermined line in the transmission and for returning the oil to the engine oiling system.

Fig. 1 diagrammatically illustrates the major components of a transmission unit embodying the features of the present invention, and in addition to facilitating the general understanding of the invention the figure is intended to aid in the understanding of the control system for the transmission illustrated in Figs. 3 and 10. Like parts in Fig. 1 are designated by the same reference characters in the detail showing in Fig. 2 of a transmission constructed in accordance with this invention.

The invention is illustrated as applied to a motor vehicle and particularly to a vehicle having a torque converter type of hydrodynamic power transmitting device between the engine of the vehicle and the driving wheels. The invention, however, is not limited to such use and it is understood that the transmission of the present invention is applicable to other uses.

Referring first to Fig. 1, the reference character 10 designates the transmission input shaft of the transmission. The reference character 12 designates the transmission output shaft. One end of the input shaft 10 of the transmission is connected through a hydraulic torque converter with the engine crank shaft 14. The torque converter includes a pump member or impeller 16 which is rigidly connected to the crank shaft to receive driving impulses therefrom. The reaction portion or stator 18 of the torque converter is connected through a one-way brake 20 with a stationary part 22 of the transmission. The brake 20 takes the reaction of the stator in one direction but allows the stator to rotate in the other direction. The turbine portion 24 of the torque converter is connected to the input shaft 10 of the transmission.

The input shaft 10 is connected to one of the three elements of a planetary gear set. Through a selective control the output shaft 12 may be operatingly connected with either one of the remaining two elements of the planetary gear set. As shown herein the input shaft 10 is connected to the external toothed sun gear 26 of the planetary gear assembly. The planet gear set also includes planet gears 28 which are supported by a carrier 30 and an internally toothed ring gear 32, the planet gears meshing with the sun gear 26 and with the ring gear 32. The input shaft 10 is coupled to a set of clutch plates 34 forming one part of a friction clutch. The planet carrier 30 is drivably connected to the other portion of the friction clutch which assumes the formation of a drum 36 having a radial supporting web or vane 38. The supporting web has a hub portion 39 journaled on a bearing 40 which may be rigidly mounted on a stationary part of the transmission case such as the part 22.

The planet carrier 30 is rigidly connected to a member 42 having internal teeth 43. The member encircles the output shaft 12 in radial spaced relation thereto and forms a part of a synchronizing clutch mechanism. The ring gear 32 of the planetary gear assembly is rigidly connected to a member 44 having internal teeth 45. Like member 42, member 44 encircles the output shaft in radial spaced relation thereto and forms part of the synchronizing clutch mechanism. The ring gear 32 carries a drum 46 which may be of the same radial dimension as drum 36 and is positioned on the side of the planetary gear set opposite thereto. The ring gear assembly including the member 44 and the drum 46 is journaled for rotation on the inner periphery of a bearing 48, which may be rigidly mounted on a stationary part of the transmission case as shown.

Brake means is associated with the planetary gear set for gripping and holding certain elements thereof to vary the drive relation between the input and output shafts. Such means comprises two brake bands, one for each drum. One band 50 encircles the drum 46 and is referred to herein as the low speed brake band. The other band 52 encircles the drum 36 and is referred to herein as the reverse brake band. Of special significance is the location of the brake bands and their respective drums to the two bearings 40 and 48. Each brake band is disposed in radial relation to its respective bearing and is positioned thereover. As a result, the reaction of the braking force is taken directly to the transmission case or a member fixed thereto instead of the gear train mechanism and thereby eliminates distortion or deflection of the gear train parts. Furthermore, whenever a brake band is applied to develop such a force, the brake drum and the bearing associated therewith are stopped from rotating in which event there is no wear on the bearing due to the force.

Keyed to rotate with the drum 36 are one or more clutch plates 54 which interleave with the set of clutch plates 34 associated with the input shaft 10. The drum 36 including the supporting web 38 and its journaled hub portion 39 defines a hydraulic cylinder. In the cylinder is a piston 56 which is actuatable to apply the clutch by compressing the clutch plates 34 and 54 together. This is accomplished by fluid under pressure delivered to the cylinder through a conduit 58. With the clutch plates engaged a direct drive relationship is established between the input shaft 10 and the output shaft 12.

The synchronizing clutch mechanism of which the internal toothed members 42 and 44 form operating parts includes a shift member 60 which is in the form of a sleeve splined to the output shaft 12 for joint rotation therewith and for relative axial movement therealong. The shift member is disposed between the clutch members 42 and 44 and is movable in the radial clearance provided between the clutch members and the output shaft 12. The shift member carries external teeth 62 which are engageable alternately with the internal teeth 43 and 45 of the two clutch members. When in axial centered relation, the shift member assumes a neutral position out of engagement with the teeth of the clutch members as shown in Fig. 1 and also in Fig. 2. When moved its maximum distance in either direction from its neutral position the shift member will engage either the teeth 43 of the clutch member 42 and couple the planet gear carrier with the output shaft or the teeth 45 of the clutch member 44 and couple the ring gear with the output shaft.

Operatively associated with the shift member 60 are elements which synchronize the speed of rotation of the shift member with either the clutch member 42 or clutch member 44 before engagement therewith. These elements include two internally toothed synchronizing blocking rings 64 and 66, one for each clutch member 42 and 44. These blocking rings are mounted upon the outer periphery of a sleeve-shaped carrier 68 and adjacent to their respective clutch members. The sleeve-shaped carrier has internal teeth 70 which mesh with the external teeth 62 of the shift member, the interengagement of the teeth providing joint rotation of the carrier with the shift member but permitting relative axial movement of one with respect to the other.

Associated with part of the transmission driven directly from the crank shaft of the engine is a pump for creating a fluid presure for use by the control system for the transmission. This pump in Figs. 1 and 2 is an oil pump 72 which may be located on the rear side of the hydraulic torque converter and driven directly from the impeller 16 thereof. A feature of the invention is that only one pump unit is required for developing the fluid pressure for controlling the operation of the transmission and thereby eliminating the necessity for a second or rear pump now incorporated in conventional hydrodynamic torque converter transmissions.

Figure 6:
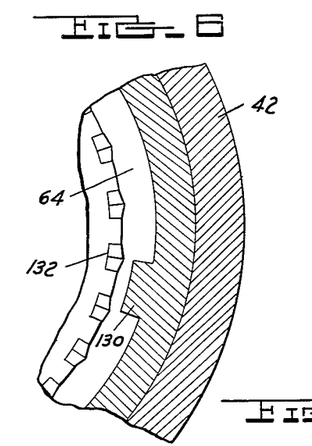
Fig. 6 is a fragmentary end view of certain of the clutch elements of Fig. 5 taken along line 6—6 thereof.
Figure 7:
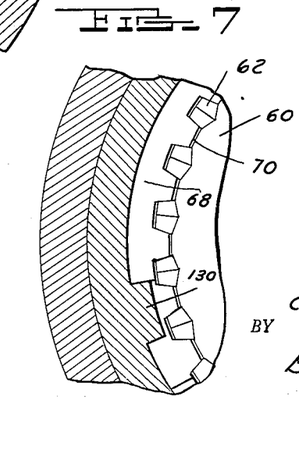
Fig. 7 is a fragmentary end view of certain other clutch elements of Fig. 5 taken along line 7—7 thereof.

Common parts of the transmission diagrammatically illustrated in Fig. 1 and appearing in the remaining figures are referred to by the same reference characters. In Fig. 3 which schematically illustrates a hydraulic control system for the operating parts of the transmission there are shown the two brake bands 50 and 52, the clutch cylinder 36—38 and the oil pump 72. Fig. 4 illustrates an assembly of parts for controlling the movement of the shift member 60. Figs. 5, 6 and 7 illustrate an adjustment provided between each of the blocking rings 64 and 66 and their common carrier 68 for easing and smoothing the meshing engagement of the teeth 62 of the shift member with either one of the internal toothed members 42 and 44 associated with the planetary gear set. Fig. 10 and associated Figs. 11 and 12 illustrate a modification of the invention for using the engine oil as the hydraulic means for effecting control and movement of the operating parts of the transmission, but otherwise embodying features of the structure illustrated in the earlier numbered figures.

*Transmission unit*

Referring particularly to Fig. 2, the elements of the transmission diagrammatically illustrated in Fig. 1 are structurally embodied in a unit including a housing or casing for the unit which may be sectionally divided longitudinally into a forward compartment 74 which surrounds the fluid operated converter and a rear compartment 76 which encloses at least the top and the sides of the planetary gear set and associated clutch and synchronizing mechanisms. The inner end of the casing section 76 may support the outer peripheral portion of the stationary part 22 of the transmission in the manner shown. The bottom of the casing section 76 may be opened and a separate pan 78 may be used to close the opening in the manner shown. The pan serves as a reservoir for oil and as an enclosure for the main control mechanism, the latter being omitted from Fig. 2 for purpose of clarity. Oil seals 80 and 82 are provided at opposite ends of the rear component of the transmission case.

The crank shaft end of the transmission unit is of conventional design including an annular plate 84 connecting the crank shaft 14 with the impeller driving member 86 of the torque converter. The latter is axially hollowed to serve as a journal mounting for the adjacent end of the input shaft 10. The opposite end of the input shaft may be integrally connected to the sun gear 26 as shown and the latter is shaped to form a journal mounting for the inner end of the output shaft 12. A bearing 88 supports the output shaft 12 intermediate its ends. The outer end of the output shaft is shaped in any suitable manner for connection with the mechanism driven by the engine such as the driving wheels of a motor vehicle. A gear wheel 90 may be provided for coupling a speedometer with the output shaft.

The one-way brake 20 for the reaction member or stator 18 of the torque converter is of conventional design including a plurality of sprags 20A located between an outer race 20B which is mounted for rotation with the stator and an inner race 20C which is held against rotation by engagement with a stationary part of the mechanism. The inner race 20 C may, for example, be splined to a hollow member or sleeve 92 which encircles the rear portion of the transmission input shaft 10 in slight radial spaced relation thereto and is fixed to the stationary part 22 of the transmission. The sprags are so arranged in angular engaging relation with the races as to allow relative rotation in one direction but prevent rotation in the other direction. Thus the sprags take the reaction of the stator 18 in one direction but permit the stator to freely rotate in the other direction.

The fluid pressure pump 72 is located on the torque converter side of the stationary part 22 of the unit and may consist of parts of conventional design as shown in Figs. 2 and 3. Included in the pump is an inner externally toothed gear 94 and an outer surrounding internally toothed gear 96. The inner gear 94 is co-axial with the input shaft 10 and is coupled to the impeller 16 of the torque converter by means of a hollow member 98 which surrounds the sleeve 92 in slight radial spaced relation thereto. The outer gear 96 is eccentrically related to the inner gear and the axis of the input shaft as best shown in Fig. 3. The mounted relation of the two gears is such that their teeth mesh for a portion of a circle and are spaced apart from one another for the balance of the circle as in conventional pumps of this character. In the space between the teeth of the two gears there is provided an arcuate member 100 which cooperates with the teeth as they move thereby to impel the liquid toward the discharge outlet of the pump. The gears 94 and 96 are enclosed in a cover 102 which cooperates with the adjacent side of the stationary part 22 to form a sealed subsidiary housing for the pump. The arcuate member 100 may be integrally connected to the cover as shown in Fig. 2.

The clutch piston 56 of the clutch mechanism for effecting direct drive relation between the input and output shafts is yieldingly urged to release a position by a coiled spring 104 which surrounds the hub portion 39 of the web 38. One end of the spring is seated on a retainer ring 106 fixed to the extremity of the hub portion 39 which encircles the bearing 40 and is journaled thereon. The opposite end of the spring bears on the piston 56 of the hydraulic cylinder which is actuable to bring the interleaving clutch plates 34 and 54 into engagement with one another. The piston 56 may be composed of two overlapping plate-like members of annular formation disposed side-by-side within the drum 36. One of the piston members is indicated at 108 and bears in an axial direction against the series of interleaving clutch plates. The other piston member is indicated at 110. It is located inside of the first described piston member and carries a hydraulic sealing ring 112 on its outer peripheral portion which slidingly engages the inside of the drum. The inner marginal portion of the piston member 110 is shaped to form a hub which extends between the spring 104 and the hub 39 and slidingly engages a hydraulic sealing ring 114 carried by the latter. The inner piston member 110 together with the sealing rings 112 and 114 cooperate with the supporting web 38 of the drum 36 to form a sealed expansible chamber which is influenced by fluid pressure directed thereinto to move the clutch plates 34 and 54 into engagement.

In the schematic view in Fig. 1 an inlet 58 is shown for directing fluid under pressure into the cylinder associated with the drum 36. In the structural embodiment of the invention illustrated in Fig. 2 this inlet may take the form of circular groove 116 formed in the hub of the stationary part 22 and communicating through ports 117 in the hub portion of the drum supporting web 38 with the interior of the cylinder. The groove 116 communicates with a source of controlled fluid pressure hereinafter described.

The structural embodiment of the planetary gear set generally follows conventional designs. As shown in Fig. 2, the sun gear 26 is integrally connected to the input shaft 10. The clutch elements 34 of the illustrated embodiment of the invention in Fig. 2 are coupled to the input shaft 10 for joint rotation therewith by means of a dished plate 118 which is connected by rivets 120 to sun gear 26. The outer peripheral portion of the dished plate has spline type slots 119 into which extend internal spline teeth of the clutch elements 34 as is evident in Fig. 2. The clutch plates 54 have external spline teeth that mesh with internal spline teeth 36A which are formed inside the drum 36. These internal spline teeth also mesh with external spline teeth located on a radial flange portion 30A of the planet carrier 30 thereby causing the drum 36 and the planet carrier 30 to rotate as a unit.

The planet gears 28 are individually rotatably supported on circularly spaced apart pinion shafts 122 which are mounted in the carrier 30 in the manner shown and revolve about the common axis of the input and output shafts as the carrier rotates. Welded or otherwise secured to the outer face of the planet gear carrier 30 is the internal toothed member 42 which forms part of the synchronizing clutch mechanism. The ring gear 32 of the planet gear set carries the drum 46 and rivets 124 may be used for securing these two members together in the manner shown in Fig. 2. Integrally joined to the ring gear is the internal toothed member 44 of the synchronizing clutch mechanism. The toothed member 44 is axially spaced from the ring gear and radially stepped inwardly therefrom to form a circular shoulder which underlies the bearing 48 and is journaled therein. The latter is enclosed within an inwardly projecting ring-shaped extension 126 to the rear component 76 of the transmission case.

An important feature of the invention is the arrangement of the parts of the synchronizing clutch mechanism. The internal toothed members 42 and 44 as well as the blocking rings 64 and 66 and the carrier 68 are radially spaced from the inner splined end of the output shaft 12. Contrary to conventional synchronizing clutch mechanisms of this character, the shift member 60 is located interiorly of the clutch parts 42 and 44 rather than exteriorly thereof. The radial spaced relation of these members and their associated parts to the output shaft provides the clearance for the shift member therebetween. One particular advantage of this arrangement of the parts is derived from the provision of internal teeth on the members 42, 44, 64, 66 and 68 of the synchronizing mechanism. Internal teeth are easy to broach and considerably less expensive to make than external teeth. The only member of the synchronizing clutch mechanism having external teeth is the shift member 60. Another advantage of this arrangement is the compact assembly of the parts such that the drum 46 and bearing 48 are disposed in radial alignment with the synchronizer and in surrounding relation thereto. This reduces the overall length of the transmission unit.

Each blocking ring 64 and 66 is coupled to the carrier 68 for joint rotation but a limited angular movement of one with respect to the other is provided for bringing the teeth of the blocking ring into properly meshing relation with the teeth of the shift member 60. Referring to Figs. 5, 6 and 7, each end face of the carrier 68 is provided with one or more recesses or slots 128, preferably two, which are located diametrically opposite to one another. These slots are cut in angular relation to the internal teeth of the carrier and opposite each blocking ring. Entering each slot 128 of the carrier is a lug 130 which is integrally connected to the adjacent blocking ring in projecting relation therefrom and is located in angular relation to the internal teeth of the blocking ring. In Fig. 5, one lug 130 is shown entering a companion slot 128 in the carrier. The slots are wide enough circumferentially of the carrier to permit the lugs and the blocking rings with which they are associated to have a limited angular or rotating movement with respect to the carrier.

Fig. 5 illustrates in a plane the neutral relation of the shift member 60 to the blocking ring 64 and the internal toothed member 42, it being understood that a similar relation exists between the shift member and the blocking ring 66 and the member 44. The external teeth 62 of the shift member 60 are shown in dotted outline in Fig. 5. The internal teeth of the blocking ring 64 are shown at 132. The adjacent ends of the two sets of teeth are chamfered as shown in Fig. 5 as are also the ends of the teeth of the internal tooth members 42 and 44. When each lug 130 is at the limit of its movement in either direction in the slot 128 the chamfers on the teeth 62 and 132 are in an offset relation such that in the act of meshing, the blocking ring will be rotated relative to the carrier so that the lug will be moved back toward the center of the slot. This will cause the chamfered ends of the teeth to wedgingly slide past one another as the shift member advances into full engagement with the blocking ring toward which it is directed. Meshing engagement is thus assured regardless of the relative angular positions of the shift member and the selected blocking ring.

The shift member 60 is provided with the usual peripheral recess 134 for receiving a shifting finger 208 which is shown in Figs. 3 and 4. As shown in Fig. 2, the peripheral recess 134 is located on the end of the shift member which projects from the synchronizer.

The blocking rings 64 and 66 are shaped with outer conical surfaces which fit into internal conical surfaces formed on the toothed members 42 and 44 as shown in Figs. 1 and 2. These conical surfaces form friction clutches which when brought into engagement will lock the blocking ring 66 with the member 44 and the blocking ring 64 with the member 42.

The carrier 68 has an outwardly projecting ring portion 136 located between the blocking rings 64 and 66 and in which radial holes 138, preferably three in number, extend through to the inside diameter of the carrier. Balls 140 are carried in the holes and are urged inwardly by springs 142 which are held in place by discs or plugs 144. When the shift member 60 is in the "N" or neutral position as shown in Fig. 1, each ball in the carrier 68 is yieldingly urged into a recess 146 cut in the external teeth 62 of the shift member. It can now be understood that an axial movement of the shift member 60 will tend to move the carrier 68 with it due to the detent action of the balls and recesses, and that an axial force applied to the shift member, which will occur when shifting from "N" to "D" (drive) or "N" to "R" (reverse) will be transferred to the carrier 68 until the balls have climbed out of their respective recesses and reach the flat part of the teeth and then such force from the shift member will no longer be transferred to the carrier.

On each side of the ring portion 136 of the carrier, and between it and the inner ends of the blocking rings 64 and 66, are springs 148. These are of the type commonly known as wave springs which extend circularly around the outside of the carrier and are waved between the side faces of the ring portion 136 and the blocking rings. Therefore, a movement of the carrier to the right or to the left from its "N" position will, through the interposed wave spring, yieldingly urge the selected blocking ring into frictionally clutched engagement with its respective internally toothed member 42 or 44. The wave springs are so proportioned that with the elements in the "N" position, as shown in Fig. 1, there is no force from the wave springs tending to engage the friction conical clutches and free relative rotation may take place between the elements thereof.

The operation of the shifting mechanism is as follows: With the shift member 60 in the "N" position, free relative rotation may occur between the shift member 60, and thus the driven shaft 12 to which it is splined, and the planet carrier 30 which is fastened to the internally toothed member 42, and the ring gear 32 which is fastened to the internally toothed member 44, as previously explained. To shift from "N" to "D" a force is applied to the shift member in an axial direction to the left as viewed in Fig. 1. This moves the shift member to the left and applies the force through the detent balls to the carrier 68, to the wave spring 136, to the blocking ring 64 and brings the clutch face of the latter into frictional engagement with the clutch face of the member 42. If there is relative rotation between the elements, the blocking ring 64 will be rotated with respect to the carrier until the lug 130 contacts one end of the slot 128 as shown in Fig. 5. The direction of relative rotation determines to which end of the slot the lug will move. With the lug at the end of the slot, the chamfered ends of the teeth 132 and 62, due to their angular relation with the lug and slot, are in the position shown in Fig. 5. As the axial movement continues, the ends of the teeth 62 strike the ends of the teeth 132 and due to the angle of the chamfer of the teeth the blocking ring will be rotated in a direction with respect to the carrier to move the lug toward the center of the slot. This movement is of course opposite to the direction that the friction clutch is attempting to move the lug and therefore a relatively high axial force is set up due to the wedging action of the chamfers of the teeth. This force reacts upon the blocking ring, firmly engaging the friction clutch, thereby causing the member 42 and the parts rotating with the blocking ring to rotate together as a unit, or with synchronized speed, or causing all of these elements to become stationary. When synchronization occurs, rotatively or non-rotatively, the relatively strong force engaging the friction clutch is lost. Also with continued movement of the shift member to the left, the detent balls will climb out of the recesses, thereby discontinuing the force from the active wave spring tending to engage the conical faces of the friction clutch and causing the friction clutch to be released. However, the speeds of the clutch elements are now synchronized and as the conical faces of the friction clutch are disengaged, the teeth 62 of the shift member and the internal teeth of the member 42, can readily align themselves, assisted by the chamfered ends of both the engaging sets of teeth. In this situation, the shift member can be readily moved to the "D" position, engaging the teeth of the shift member with the internal teeth of the member 42, thus connecting the planet carrier 30 with the driven shaft 12.

It should be understood that in like manner a shift from "N" to "R" will give a synchronized engagement of the teeth 62 of the shift member with the internal teeth of the member 44. This will connect the ring gear 32 with the driven shaft 12.

Control system

As previously described in connection with the schematic showing in Fig. 1, the two brake bands 50 and 52 function to control the operation of the moving parts of the transmission and by their positions with respect to the drums 46 and 36 determine whether the output shaft 12 rotates in a forward or reverse direction and at the same or different speed ratio with respect to the input shaft 10. The clutch mechanism within the drum 36 also serves to control the operation of the transmission. When the clutch elements 34 and 54 of the clutch mechanism are actuated to engaging position by the piston 56, a direct drive relation is established between the input shaft 10 and the output shaft 12, provided however that the shift member 60 is in its drive position. One of the brake bands, in this instance the low speed brake band 50, also serves as a parking brake when the shift member 60 is in reverse or "R" position.

The brake bands 50 and 62 may have their interior surfaces faced with friction material for engaging the peripheries of the drums. The bands are pretensioned and mounted to encircle the drums without contact therewith but are contractible to frictionally engage the drums to retard or hold them from rotation. Opposing forces act on each brake band, one functioning to move the band into engagement with its respective drum and the other functioning to move the band away from engagement with the drum. In the illustrated embodiment of the invention the low speed brake band 50 is continuously tensioned by spring means toward and into engagement with the drum 46. During the operation of the transmission this spring applied force may be overcome and the band moved away from engagement with the drum by means actuated from the control system. On the other hand, the reverse brake band 52 is normally tensioned away from engagement with its drum 36 by its inherent resiliency but this force may be overcome and the band applied against the drum by means actuated by the control system.

The mounting and operating characteristics of the two brakes 50 and 52 are shown in Fig. 3. Since the mounting of the reverse brake 52 is the simplest of the two it will be first described. The brake band 52 substantially completely encircles the drum 36 and its juxtaposed opposite free ends are each shaped in the manner shown in Fig. 3 to form a seat for receiving one end of an operating strut member. One end 150 of the brake band is adjustably held in relatively fixed relation to the drum. This comprises an externally threaded anchoring member or screw 152 rotatably threadedly engaged in a wall portion of the housing 76 and projecting toward the end 150 of the brake band. Forming a non-rotatable extension to the inner end of the anchoring screw is a cap 153 and between the cap and the seat formed on the end 150 of the brake band is a strut 154. It is evident that the anchor screw may be threadedly adjusted from the outside of the transmission case for periodical adjustment of the brake band if necessary as wear occurs.

The opposite free end 156 of the brake band 52 is operatively coupled to means actuated by the control system. As shown in Fig. 3, this may be accomplished by a strut 158, similar to the strut 154, which is disposed between the seat on the end 156 of the brake band and a similarly formed seat 160 on a rocking member 162. A pin 164 at one end of the rocking member forms a pivotal axis extending parallel to the axis of the brake band and about which the member is swingable. The opposite end of the rocking member 162 is engaged by force applying means associated with the control system which in this instance is hydraulic in character. As shown, the force applying means for rocking the member 162 comprises a fixed cylinder 166, a movable piston 168 having a conically pointed stem 170 engaging the outer end of the rocking member, and a spring 172 which acts in opposition to the fluid introduced into the cylinder. It is evident from the arrangement of the parts shown in Fig. 3 that when fluid under pressure is introduced into the cylinder by way of a conduit 174 it will move the piston against the spring 172 and cause the rocking member to swing toward the brake band in a clockwise direction, and since the seat 160 on the rocking member is located closer to the pivotal axis than the piston engaging end, it will act with force multiplying effect to contract the brake band into holding engagement with the drum 36. When the fluid is allowed to drain from the cylinder, assisted by the force of the spring 172 and the inherent resiliency of the brake band, the piston will return to the position shown in Fig. 3 allowing the brake band to expand out of engagement with the drum.

The low speed brake band 50 is constructed similarly to the reverse brake band 52. One end 176 of the band is adjustably held in relatively fixed relation to the periphery of the drum 46 by means of an anchoring screw 178 which is similar to the previously described anchor 152 and extends to the outside of the transmission case for adjustment. The opposite end 180 of the brake band 50 is operatively coupled to a rocking member 182 generally similar to the rocking member 162 but of longer dimension for the purpose described hereinafter. Rocking member 162 is pivoted about an axis formed by a pin 184 and operates on the end 180 of the brake band through a strut 186 similar to the strut 158 previously described. The relation of the rocking member 182 to the brake band 50 is such that upon upward clockwise swinging movement from the position shown in Fig. 3 it reduces the thrust imposed through the strut 186 on the end 180 of the brake band enabling the latter to expand away from engagement with the drum. The action is contrary to that of the rocking member 160.

Continuously acting on the rocking member 162 in the direction to apply the brake 50 is a relatively strong spring 188, one end of which is seated in a cup-shaped housing 189 fixed to the transmission case. The spring is slightly offset to the plane of the anchoring screw 178 and as is evident in Fig. 3 its opposite end operates through a ball joint 190 on the outer end section of the rocking member. The ball joint enables the spring to accommodate itself to the limited swinging movement of the rocking member. Acting on the rocking member between its pivotal axis and the spring 188 is a fluid pressure applying device in the form of a cylinder 192, a movable piston 194, and a stem 196 fixed to the piston and provided with a tapered end which engages the rocking member. Within the cylinder is a relatively light spring 198 which yieldingly acts in the direction to move the piston toward the rocking member to hold the pin in continuous engagement therewith. The force with which the cylinder spring 198 acts on the rocking member is less than that of the spring 188 and normally, unless fluid pressure is introduced into the cylinder, the stronger force of the spring 188 will not only overcome the cylinder spring but also swing the rocking member sufficiently counterclockwise as viewed in Fig. 3 to contract the brake band into holding engagement with the drum 50. However, upon introduction of sufficient fluid pressure into the cylinder by means of a conduit 200, the piston will move the rocking member in the direction to expand the brake band and release its engagement on the drum 50. When the fluid is allowed to drain from the cylinder the tension of the spring 188 will overcome the cylinder spring 198 and the inherent resiliency of the brake band and contract the latter into holding engagement with the drum 50.

It is thus apparent from the preceding description of the operation of the brakes 50 and 52 that fluid pressure introduced into the two cylinders 166 and 192 function in a manner opposite to one another, cylinder 166 acting to apply the reverse brake band 52 and cylinder 192 acting to release the low speed brake band 50. The hydraulic system hereinafter described is arranged to deliver fluid under pressure to the two cylinders to cause their operation in this reverse manner. It is understood that this arrangement applies to the illustrated embodiment of the invention and that other means of applying or releasing the brakes may be employed.

A manual control is provided for governing the action of the low speed brake band 50 independently of the normal source of hydraulic pressure as represented by the pump 72. Any suitable control, for instance, a manually operated pump as in the hydraulic wheel brake systems of most present day motor vehicles may be employed to supply fluid pressure to the cylinder 192. Or, as illustrated in Fig. 3, the rocker arm 182 may be provided with an extension beyond the bearing point of the spring 188 thereon. Connected to this extension is a flexible cable 202 which may extend to the driver compartment of the motor vehicle. The connection is such that when the cable is pulled or tensioned it will cause the rocker arm to swing about its pivotal mounting in the brake releasing direction. The cable 202 passes through the wall 76 of the transmission case and for the greater portion of its length the cable may be sheathed by a tubular shaped covering 204 through which the cable axially shifts.

Fig. 3 also schematically shows the clutch mechanism associated with the drum 36 including the interleaving clutch plates or discs 34 and 54, the piston 56 which for purpose of clarity is shown as formed in one piece. A fluid pressure delivery conduit 206 directs the fluid to the clutch cylinder for actuating the clutch. In the structural embodiment of the invention illustrated in Fig. 2, the delivery conduit 206 opens into the circular groove 116 formed in the hub of the stationary part 22 of the transmission assembly. It is evident that when fluid under pressure is directed by the conduit 206 into the cylinder of the clutch mechanism that the latter will compress the clutch plates together. As previously described, this will establish a direct drive relation between the input shaft 10 and the output shaft 12, provided however, that the shift member 60 has been moved into engagement with the internal toothed member 42 of the sychronizing mechanism.

The axial movement of the shift member 60 is controlled by a finger 208 which is located inside of the transmission case and projects into the peripheral recess 134 of the shift member. The opposite side walls of the peripheral recess 134 function as thrust surfaces against which the finger acts to axially move the shift member. The finger 208 is carried on one end of a swinging member or lever 210 which is pivoted intermediate its ends on a bearing 212. In the illustrated embodiment of the invention the lever 210 swings in a vertical plane paralleling the axis of the shift member 60 and the finger 208 is carried on the upper end. In side elevation, as shown in Fig. 3, the lever 210 is shaped with a widened lower end having an inverted downwardly opening generally V-shaped indentation or notch 214. The indentation is provided with complementary side walls 216—216 which incline toward one another and have a slight concave curvature as shown. The upper approaching ends of the two side walls 216—216 terminate in a rectangularly shaped subsidiary recess 218.

Disposed below the lever 210 and overlapping the lower indented end thereof is a second swinging member or lever 220. An intermediate portion of the second lever is fixed to one end of a rock shaft 222 which is journaled in a projecting portion 224 of the transmission case forming a housing for the shaft. The opposite end of the rock shaft extends from the housing 224 and connected thereto is a control lever 226. The latter is located outside of the transmission case and is connected to a control device in the driver compartment of the vehicle and usually mounted on the steering-wheel column. One end of a rod 228 or other form of connection leading from the lever 226 to the control levice is shown in Fig. 4. It is evident that swinging movement of the outside lever 226, as influenced by the control rod 228, will rock the shaft 222 and swing the inside lever 220. The latter is mounted by the rock shaft so that it will swing in a plane closely paralleling the shift control lever 210.

The lever 220 is operatively connected into the control system which governs the speed selection and direction of operation of the transmission and for this purpose the lower end of the lever is shaped to engage and operate a moving part of the system. As shown in Figs. 3 and 4, the lower end of the lever 220 is narrowed to form a finger 230 which enters a peripheral recess 232 of a master or selector control valve member 234, and it is evident that swinging movement of the lever will impart reciprocating movement to the valve member.

The two swingable members or levers 210 and 220 form an improved control and timing device for operatively distributing the control force exercised by the rod 228 and the rock shaft 222 to the control units of the transmission. The mechanism constituted by the two levers functions in a novel manner to correlate the control forces applied to the transmission and to time the actions of the shift member 60 and the master control valve 234 such that the former is fully engaged with the selected toothed member 42 or 44 before the direct drive clutch or the control brakes 50 or 52 perform their respective functions. This is an important feature of the invention for it allows the shift member 60 to be shifted to complete engagement with either the member 42 or 44 without imparting a driving torque on the shift member during its synchronizing travel or its later travel to complete engagement, thereby providing a free and easy shift. When the engine is running, the input shaft 10, and thus the sun gear 26, will tend to rotate due to the coupling effect of the torque converter. If the shift member is shifted to engagement with the member 44, which is connected to the ring gear 32, there is no reaction transmitted from the rotating sun gear 26 through the planet carrier 30 and the ring gear 32 to the shift member for the reason that the planet carrier is free to rotate. In like manner, if the shift member is moved into engagement with the member 42 which is connected to the planet carrier 30, there is also no reaction from the rotating sun gear 26 through the planet carrier to the shift member for the reason that the ring gear 32 is free to rotate. In either of these shift examples, there is no reaction member present in the planetary gear set.

To obtain these operating characteristics in the illustrated embodiment of the invention, the two levers 210 and 220 are operatively coupled together for joint action but in such a manner that one lever is capable of movement beyond that of the other lever. The upper end of the lever 220 is provided with a laterally projecting element or pin 236 which projects into the plane of the lever 210 and enters the V-shaped indentation or notch 214 thereof. The pin is preferably cylindrical in shape and in the vertical aligned position of the levers is shown in full lines in Fig. 3, the pin is received in the rectangular recess 218. The connection formed by the pin couples the two levers for joint swinging movement about their respective pivotal axes but such that they swing in opposite rotative directions to one another.

When the lower lever 220 is swung by the rock shaft 222 and control rod 228 in a counterclockwise direction as viewed in Fig. 3, the pin 236 presses against one side of the recess 218 causing the upper lever 210 to swing in a clockwise direction. Since the pin traverses an arcuate path centered on the axis of the rock shaft 222, continued swinging movement of the lower lever in the same direction will cause the pin to ride out of the recess 218 and ineffectually sweep past one of the slightly concave sides 216 of the notch 214. The curved contour of each side edge 216 of the notch is such that when the pin leaves the recess 218, the center of the side edge past which the pin moves substantially coincides with the axis of the rock shaft as shown by the dotted position of the upper lever. When the pin leaves the recess 218 the drive connection between the two levers is broken and the lower lever may continue to swing without imparting any movement to the upper lever. Upon return movement of the lower lever, the pin will reenter the recess 218 and abutting the opposite side wall thereof will swing the upper lever in the opposite direction and toward its full line position shown in Fig. 3.

During the initial movement of the lower lever 220 from its full line position in Fig. 3, the pin 236 functions as a cam, driving the upper lever 210 and causing the latter to shift the member 60 axially along the output shaft 12. The parts are so structurally related that when the pin leaves the recess the upper lever has shifted the member 60 into fully engaged position with the selected clutch member 42 or 44. The master valve 234 follows the movement of the lower lever through its entire swing in either direction. As is hereinafter more particularly pointed out, the structural relation of the valve member 234 to the ports closed and opened thereby is such that during the initial swing of the lower lever the valve member commences to move from one operating position and only completes its movement to the selected operating position during the overtravel of the lower lever beyond the released position of the upper lever.

The master control valve member 234 reciprocates in a valve body at 238 in Fig. 3. The latter is hollowed out and ports are interiorly provided which are opened and closed by the different positions assumed by the valve member in the body. The valve member is cylindrical in cross section and is longitudinally constructed as shown in Fig. 8 with areas of alternately larger and smaller diameters. Formed integrally on the valve member are space circular lands 240 and 242 separated by a reduced circular portion or neck 244. To the right of the inner land 242 as viewed in Fig. 8 is a second reduced portion 246. The alternately expanded and reduced portions of the valve cooperate with the ports in the valve body to selectively determine the flow of fluid under pressure to the hydraulic cylinders 166 and 192 and to the cylinder 38 controlling the clutch plates 34 and 54. Fluid under pressure for actuating these hydraulic motors is developed by the pump 72 previously described, the discharge conduit of which is schematically shown at 248 in Fig. 3 as leading from the pump to the center of the valve housing 238.

The master control valve 234 reciprocates in a bore in the body 238. For the purpose of explaining the fluid distribution, the valve 234 is distorted axially in Fig. 3 to show two positions of the valve it being understood that the valve is constructed in the manner shown in Fig. 8. Two other positions of the master control valve are similarly shown in Fig. 9, which for purpose of convenient comparison is located in projected relation immediately below the valve in Fig. 3.

The fluid pressure delivered by the pump discharge conduit 248 is admitted through port 250 to the bore in which the master valve 234 reciprocates. This port is shown as located substantially centrally in the valve housing 238. The port through which the conduit 206 receives fluid under pressure for operating the clutch cylinder 38 is shown at 252. The port through which the conduit 174 receives fluid under pressure for operating the brake cylinder 166 is shown at 254. However, the conduit 200 which delivers fluid under pressure for operating the brake cylinder 192 communicates with the valve bore through two axial spaced apart ports 256—256 located on opposite sides of the admission port 250 and between the same and the two ports 252 and 254. The lands 240 and 242 on the master valve slidably fit the bore and act to cut off delivery to any port opposite which they are disposed. The reduced portions 244 and 246 of the valve provide clearances in the bore for transfering fluid from the admission port 250 to any of the other ports in the valve housing with which they communicate.

Drainage ports are provided in the valve housing 238 for permitting return flow of some of the fluid delivered to the hydraulic motors 38, 166 and 192. As shown in Fig. 3, and also in Fig. 9, opposite side portions of the valves housing aligning with the bore in which the valve 234 reciprocates are provided with drain ports or holes. These ports are indicated by the reefrence characters 258 and 260 and are so dimensionally formed that the lands 240 and 242 of the valve member are capable of slidingly fitting the ports and cutting off any leakage of fluid therethrough. The valve housing 238 is preferably located in the area enclosed by the pan 78 as shown in Fig. 4, and it is evident that when either or both drain ports 258 and 260 are opened they will allow the fluid to escape into the fluid reservoir contained within the pan.

The positions to which the master valve 234 may be moved are shown in Fig. 3 by the letter designations "L," "D," "N," "R" and "P." These refer respectively to "Low Speed Drive," "Direct Drive," "Neutral," "Reverse" and "Parking Brake." The vertical lines appearing above each letter designation in Fig. 3 indicate the position of the finger 230 and the peripherally recessed end of the master valve in each of these control positions. It is assumed that similar letter designations are associated with the manual control device on the steering wheel column for operating the connecting rod 228 and the rock shaft 222.

The neutral position of the valve 234 is that shown by its uper half in Fig. 3. In this position it is evident that fluid under pressure admitted through port 250 will flow to the branch ports 256—256 of the conduit 200 and direct the fluid into the cylinder 192. This will move the piston 194 therein in the direction to release the brake 50 on the drum 46. The result is the drum 46, and associated parts including the ring 32 and the toothed member 44 are free to rotate. In this position, the ports 252 and 254 are cut off from the admission port 250 but the fluid therein is capable of draining through the holes 258 and 260 in each end of the valve housing 238, thereby releasing the direct drive clutch plates 34 and 54 and the reverse brake 52. Also in this position the two levers 220 and 210 are vertically disposed as shown in full lines in Fig. 3, in which position the shift member 60 is in neutral position and out of engagement with both of the toothed members 42 and 44. Thus, the output shaft 12 is free of any drive connection with the gear train and the input shaft 10. If the transmission is installed in a vehicle with the driving wheels of the vehicle coupled to the output shaft of the transmission, the vehicle may be towed without rotating the gear train, and therefore, no oiling system is required during the towing operation, which in most transmissions of this character is essential.

If it is desired to shift the transmission to "Reverse" condition, the connecting rod 228 and the rock shaft 222 are moved by the operator to the "Reverse" indication appearing on the steering column control. This will swing the lower lever 220 in a counterclockwise direction and move the master valve to the right in Fig. 3 bringing the finger 230 to the position marked "R." During the initial movement of the lever 220, the upper lever 210 swings in a clockwise direction as viewed in Fig. 3 and shifts the member 60 into full engagement with the toothed member 44. At the completion of this initial movement, the master valve will assume the position shown by its lower half in Fig. 3. In this position, it is seen that communication between the admission port 250 and one of the branch ports 256 is still maintained thus holding the low speed brake 50 in released condition. In this position, the finger 230 is still short of the mark "R" indicated in Fig. 3.

During the overtravel of the lower lever 220 after the pin 236 is disengaged from the recess 218, the master valve shifts to the position shown by its upper half in Fig. 9. This is the position assumed by the valve when it has completed its movement to reverse control condition. In this position, the land 242 closes or plugs the drain hole 260 and the neck portion 244 establishes communication between the admission port 250 and the port 254 enabling fluid pressure to be directed into the cylinder 166 to apply the reverse brake band 52 on the drum 36. This will hold the planet carrier 30 and thus the planet pins 122 from revolving about the axis of the aligned input and output shafts 10 and 12. Moreover, in this position, communication is still maintained between the admission port 250 and one of the branch ports 256 leading to the low speed brake cylinder 192, while the direct drive clutch is still being drained through conduit 206, port 252 and the hole 258, thus maintaining the low speed brake and direct drive clutch in released condition. It is evident by this example that the hydraulic motor for applying the reverse brake is only brought into operation after shift member 60 has fully engaged the selected toothed member 44. In this condition, when the input shaft 10 is rotated in a counterclockwise direction, as viewed from the rear of the transmission, the sun gear 26 which is attached thereto will rotate the planet pinions about their respective pins 122 in a clockwise direction. The planet pinions will rotate the ring gear 32, the member 44, the shift member 60, and output shaft 12 in a clockwise direction and therefore the transmission is in reverse drive.

The position of the lower half of the master valve 234 shown in Fig. 9 is that assumed when the parts of the transmission have been moved to brake the vehicle for parking purposes. To reach this position the master valve is shifted slightly beyond its reverse position and to the mark designated "P." In this position the land 240 of the master valve completely blocks the admission port 250 cutting off further delivery of fluid pressure to the valve unit. Moreover, it is evident in this position that the ports 252, 254 and 256—256 by means of the neck portion 244 are in communication with one another and the drain hole 258, allowing a fluid pressure drop to occur in the hydraulic motors 38, 166 and 192. In the case of the motor 192, this will permit the spring 188 to apply the low speed brake to the drum 46 and since the latter is coupled to the output shaft 12 by the shift member 60 this braking effect may be utilized as a parking brake for the vehicle. In the case of the two remaining hydraulic motors 36 and 166 the pressure drop will release the direct drive clutch plates 34 and 54 and release the reverse brake band 52.

In parking brake condition, the brake band 50 holds the drum 46, the ring gear 32, the member 44, the shift member 60, and the output shaft 12, thereby locking the output shaft against rotation and providing a brake for the same. It should be noted that when in the parking condition, there is no oil pressure required for any of the servomotors and therefore, the engine and the engine driven pump may be stopped without changing the effectiveness of the brake. It should further be noted that the engine may be started and accelerated as though the transmissions were in neutral without imparting a drag torque through the converter, for even though the ring gear is held against rotation by the brake band 50, the input shaft 10, and the sun gear 26 may rotate freely as there is no reaction member for the planetary gear set, the planet carrier 30 being free to rotate.

If it is desired to shift into or out of the parking condition when the engine is not running, and therefore there is no fluid pressure available from the pump 72 to disengage the brake band 50 from the brake drum 46, the manual brake release 202 previously explained may be operated. By releasing the brake drum 46, there can be no torque reaction between the teeth of the member 44 to which the brake drum is attached and the teeth 62 of the shift member 60, therefore, the teeth may slide easily into or out of engagement.

The selector control valve 234 is shifted in the opposite direction from neutral in order to place the transmission either in direct or low speed drive condition. This is effected by clockwise movement of lever 220 in Fig. 3. Similarly as in the operation of shifting to reverse, the upper lever 210 responds to the initial swing of the lower lever 220 and moves the shift member 60. However, in this case the shift member moves toward and into engagement with the toothed member 42, the two members being synchronized for interengagement by the blocking ring 64 and associated parts as previously explained. The master valve 234 is also moved during the early part of the swing of the lever 220 but not sufficiently for it to change the distribution of the fluid pressure to the hydraulic motors. It is only in the overtravel of the lever 220, and after the shift member is fully engaged, that the selector valve is brought into either direct drive or low speed drive position to control the proper distribution of the fluid pressures to the hydraulic motors, this timing relationship being introduced by the overtravel relationship established by the ability of lever 220 to move, after full engagement of the shiftable clutch 60, while pin 236 travels over the arcuate surface of the yoke 210.

In the direct drive position of the selector valve, the finger 230 assumes a position in line with the letter designation "D." In this position the land 240 plugs the drain hole 258 and the valve directs fluid pressure from the port 250 through the neck 244 to both ports 252 and 256 and through the passages 200 and 206 to the clutch cylinder 38 and the low speed brake cylinder 192. However, in this position the land 242 cuts off delivery of pressure to the reverse brake cylinder 166 which may drain through passage 174, port 254, and the drain hole 260 that is open around the reduced portion 246. Thus the direct drive clutch plates 34 and 54 are brought into engagement and the brakes for the drums 36 and 46 are released. The drive is then through the input shaft 10, the clutch plate carrier 118, clutch plates 34, 54, drum 36, planet carrier 30, the member 42, the shift member 60, and the output shaft 12. As all the members, including the input shaft and the output shaft, are rotating as a unit, the transmission is in direct drive.

When the selector valve 234 is moved further to the left as viewed in Fig. 3 it will assume the low speed drive position as indicated by the letter designation "L." In this position, the land 242 will cut off the admission port 250 and the port 252, neck portion 244, ports 256—256, 254 are in communication with one another and with the drain hole 260, causing a pressure drop in the lines to all of the hydraulic motors. In this circumstance, the direct drive clutch plates and the reverse brake band will be released but the spring 188 will apply the low speed brake 50. The drive is then through the input shaft 10 to the sun gear 26, and as the ring gear 36 is held against rotation by the drum 64 and brake band 50, the planet pinions 28 will be rolled around the ring gear by the sun gear, carrying the planet carrier 30 around with them at a reduced speed of rotation in relation to the sun gear. The planet carrier is locked in driving relation with the output shaft 12, through the member 42, and the teeth 62 of the shift member 60. Therefore, there is a driving speed ratio between the input shaft and the output shaft and the transmission is in low speed drive.

The following chart shows the operating conditions of the various parts of the control system and the function of the fluid pressure in all of the five driving relations:

| Shift Member Position | Clutch | Low Speed Brake | Reverse Brake | Clutch Cylinder | Low Speed Brake Cylinder | Reverse Brake Cylinder |
|---|---|---|---|---|---|---|
| Low Speed | Drive | Disengaged | Applied | Released | O | O | O |
| Direct Drive | do | Engaged | Released | do | X | X | O |
| Neutral | Neutral | Disengaged | do | do | O | X | O |
| Reverse | Reverse | do | do | Applied | O | X | X |
| Park | do | do | Applied | Released | O | O | O |

In the right hand position of the above chart, each "X" indicates application of fluid pressure to the cylinder designated and each "O" indicates drainage or reduction of fluid pressure to the cylinder affected.

To prevent excess fluid pressure from being applied by the oil pump 72, there may be provided any desirable release valve in the line 248 leading to the master valve control unit. Such a release valve is schematically shown at 261 in the conduit 248. It may be a spring loaded plunger type of valve shown which, when the fluid pressure exceeds a desired maximum, will drain some of the fluid from the line. The drained fluid may flow directly into a conduit 262 leading to the interior of the torque converter. A second spring loaded release valve 263 may be provided in the feed line 262 to maintain the pressure in the torque converter at a desired maximum which may be below that delivered by conduit 248 to the hydraulic control system. Fluid drained by the second valve 263 may be conducted by a line 264 to the inlet of the pump 72 or allowed to drain to the oil reservoir. Oil from the interior of the torque converter will flow axially along the input shaft 10 between the same and the sleeve 92 and will pass through suitable holes and ports such as indicated at 294 and 292 to lubricate the transmission gear and other parts.

In Fig. 3, the rocking brake control members 162 and 182 are schematically shown as pivotally mounted on separate pins 164 and 184 respectively. In the structural embodiment of the invention illustrated in Fig. 2, these two pins may be combined into one long shaft 265 disposed below the drums 36 and 46 and above the pan 78. In such form of mounting, the members 162 and 182 are pivotally mounted on separate sections of the shaft as shown in Fig. 2.

*Modification*

Figs. 10, 11 and 12 illustrate a modification of the invention wherein the source of fluid pressure for operating the hydraulic control mechanism of the transmission is derived from the oiling system of the engine and also wherein oil from such source is used in the torque converter and for lubricating certain parts of the transmission. Common parts of this and the preceding embodiment of the invention are referred to by the same reference numerals.

Referring to Fig. 10 there is schematically shown at the left an engine oil pump generally indicated at 266 and comprising two meshing gear wheels 268 and 270. The pump may be mounted on the engine as in conventional practice. The intake to the pump is shown at 272 and the discharge outlet at 274. A pressure release valve is shown at 276 in the pump discharge outlet which is similar to the release valve 261 previously described. The fluid conducting system divides at the release valve 276, one line 310 delivering oil to the inlet port 250 of the valve housing 238 where it is distributed to the various hydraulic motors by the master valve 234 previously described. The excess pressure drained from the outlet 274 by the release valve 276 is conveyed to a second line or conduit 278. This conduit may contain a fluid pressure release valve 280, similar to release valve 263, for holding the fluid pressure in the line 278 either at or below the desired maximum.

The conduit 278 furnishes oil for lubricating the engine and communicates with a peripheral groove 282 which may be formed as shown on the engine crank shaft 14. The transmission communicates with the engine lubricating system and for this purpose the crank shaft is provided with one or more radial holes 284 which connect the peripheral groove 282 with an axial passage 286. Passage 286 opens out through the end of the crank shaft and into communication with an axial open-ended passage 288 in a pilot mounting 290. A suitable oil seal 291 prevents the oil from escaping around the pilot. From the axial passage of the pilot mounting the oil is conveyed through passages 289 into the hydrodynamic torque converter wherein the pump portion, stator, and turbine portion of this device are located. The pump blades, stator, and turbine member, as well as the clutch spring 104, have been omitted from Fig. 10 for purpose of clarity. The oil furnished to the torque converter will flow axially along the input shaft 10 between the same and the sleeve 92 and thence into the transmission housing by way of suitable ports such as indicated at 292 and 294 to oil the transmission gears and other parts of the transmission as previously explained.

The oil delivered to the transmission in this manner drains into the pan or sump 78 forming the bottom of the transmission case and accumulates therein as shown at 296 in Fig. 11. As in the previously described embodiment of the invention, the valve housing 238 is located in the sump and its drainage ports open thereinto. To limit the level to which this oil may rise in the sump there is provided a novel device for picking up the oil when it exceeds a predetermined level and for returning the oil back to the engine pump. Such means comprises revolvable vanes or paddle blades carried by one or both drums 36 and 46. As shown herein, the drum 36 carries two such vanes 298, preferably located diametrically opposite to one another, and the other drum 46 similarly carries a pair of vanes 299. The two sets of vanes may be laterally projected from their respective drums and toward one another in the manner shown in Fig. 10.

Cooperating with the vanes is a basin 300 of substantially semi-circular channel shaped formation. The bottom of the trough is provided with holes 305 through which oil may rise. The vanes sweep through the basin past the inner wall surfaces thereof and any oil accumulated therein will be swept up by the vanes and splashed against the inner side wall surfaces of the transmission case.

Disposed along the opposite side walls of the transmission housing are similar inclined channel shaped troughs 302—302 which are so located as to catch the oil draining down the walls. As shown in Fig. 12, the troughs slant downwardly toward the engine and any oil accumulated therein will drain in that direction. At the lower end of each trough there is provided a conduit 304 which communicates by gravity flow with the engine reservoir 306 and drains this collected oil back thereto. A fluid circuit is completed by a conduit 308 which leads from the reservoir 306 to the intake 272 of the pump 266.

General operation

A hydrodynamic torque converter may be in the line of the drive between engine and the input shaft 10 of the transmission as illustrated in the drawings and when used in a motor vehicle, due to the torque multiplying effect of the torque converter, all normal starting movement of the vehicle may be done with the transmission in direct drive. The low speed drive may be used for climbing very steep grades and other heavy pulling such as through mud, sand, and the like. The low speed drive also provides a means of using the engine effectively as a brake for descending steep grades.

The unloaded synchronized easy shift previously explained makes it possible to rapidly shift back and forth between reverse and direct drive or reverse and low speed, thereby making it possible to rock the car out of a snow pocket or a mud pocket.

The vehicle may be pushed to crank the engine in the following manner: Before the push, the operator may shift the control mechanism to the low speed position. Due to the spring 188 and associated parts, the brake band 50 is in the applied condition to hold the drum 46 connected with the ring gear 32 to furnish a reaction member (the ring gear) for the planetary gear set. The teeth 62 of the shift member 60 can easily be shifted to engagement with the teeth of the member 42 connected with the planet carrier 30 as the chamfered ends of the engaging teeth will slightly rotate the teeth of the member 42 if necessary to align for engagement. It should be noted that there is no resistance to the rotating for alignment as the planet carrier is free to rotate, for although the pinions 28 carried thereon will rotate the sun gear 26, the shaft 10, and the torque converter member 24, there is no torque reaction on the member 24 as the torque converter is not rotating. With the transmission in low speed drive the car is pushed forward which rotates the shaft 12 and through the planetary gear set, rotates the shaft 10 and the torque converter 24. When the member 24 is rotating at sufficient speed to fluidly transfer sufficient torque to the torque converter member 16, connected with the engine, to overcome the cranking torque of the engine, the engine will be cranked.

Another method is to use the manual control to disengage the brake band 50. Then the car will roll free whether the shift mechanism is in neutral or the low speed position for, if it is in low speed position there will be no reaction member for the planetary gear set. When the operator judges that the car is rolling at sufficient speed to crank the engine, he may shift to low speed drive, in the event he has not as yet done so, and operate the manual control for application of the brake band 50. With the reaction member of the gear set thus held against rotation the shaft 10 will be rotated for cranking the engine in the manner previously described.

As has been explained, all the requirements of the transmission may be accomplished without the use of a fluid pump driven by the vehicle wheels, commonly known as the transmission rear pump, and the invention also includes, as shown in Figs. 8, 9 and 10, a method of eliminating the transmission engine driven pump, commonly known as the transmission front pump. Thus, two costly units may be eliminated. Furthermore, to operate two such pumps requires, under certain conditions, as much as six horsepower. This power must come from the engine and on small vehicles with relatively low horsepower engines such a loss is appreciable both in power and in fuel economy.

What I claim is:

1. In a transmission, the combination of a drive member, a driven member, a planetary gear set having a sun gear, a ring gear, a planet gear, and a planet gear carrier, means connecting the drive member with the sun gear, a clutch element for the ring gear, a clutch element for the driven member engageable with the clutch element for the ring gear, brake means engageable with the planet gear carrier for preventing rotation of the planet gear carrier, brake means engageable with the ring gear for preventing rotation of the ring gear, biasing means for engaging said last-mentioned brake means, power-operated servomotor means for causing engagement of either of said brake means, a controller for controlling the actuating means, a selecting device for controlling the engagement of the clutch elements, timing means associated with said selecting device and controller so that the clutch elements are completely engaged before the controller allows engagement of either one of said brake means, and means associated with the controller and selecting device for obtaining a combination whereby the clutch element for the driven member is engaged with the clutch element for the ring gear and the brake means for the ring gear is concurrently engaged therewith thereby to provide a brake for the driven member while the drive member is freely rotatable.

2. In a transmission, the combination of a drive member, a driven member, a planetary gear set having a sun gear, a ring gear, a planet gear, and a planet gear carrier, means connecting the drive member with the sun gear, a clutch element for the ring gear, a clutch element for the driven member engageable with the clutch element for the ring gear, brake means engageable with the planet gear carrier for preventing rotation thereof, brake means engageable with the ring gear for preventing rotation thereof, actuating means for causing engagement of the brake means, a controller for controlling the actuating means, a selecting device for effecting engagement of the clutch elements and means including timing means operatively connecting the selecting device with the controller in such a way that the selected clutch elements are completely engaged before the controller allows engagement of either one of said brake means, means associated with the controller and selecting device for obtaining a combination whereby the clutch element for the driven member is engaged with the clutch element for the ring gear and the brake means for the ring gear is engaged therewith thereby to provide a brake for the driven member while the drive member is freely rotatable, and separate manual means for disengaging the ring gear brake means.

3. In a transmission, the combination of a drive member, a driven member, a planetary gear set having elements for providing a driving connection between said members, means connecting one of the elements of the gear set with said drive member, means including engageable tooth elements for connecting another one of the planetary elements with the said driven member, a brake means for holding the last mentioned one of the planetary elements against rotation concurrently with engagement of said tooth elements, a continuously acting yieldable actuating means for applying the brake means, and manual control means for overcoming said actuating means for releasing the said brake means.

4. In a transmission, the combination of a drive member, a driven member, a planetary gear set including a sun gear, a ring gear, a planet gear, and a planet gear carrier, means connecting the drive member with the sun gear, shiftable clutch means for disconnectibly coupling the driven member with either the ring gear or the planet gear carrier, brake means engageable with the planet gear carrier for preventing rotation thereof, brake means engageable with the ring gear for preventing rotation thereof, a friction clutch means for locking the planetary gear set so that the elements thereof rotate together as a unit, hydraulically operable motor means for each of the said brake means and the said clutch means for actuating same to engagement or disengagement in response to fluid under pressure, a source of fluid under pressure, a fluid conducting system including a selector valve arranged to selectively direct fluid from said source to any of the at least three motor means or to drain the same, a shifting mechanism connected with the shiftable clutch means with the selector valve in such a way that movement of the shifting mechanism to various positions may obtain conditions whereby the shiftable clutch means connects the driven member with either the ring gear or the planet gear carrier, or disconnect the driven member from both the ring gear and the planet gear carrier, and the selector valve directs fluid to one or more of said motor means for controlling the engagement or disengagement of the brake means and the friction clutch means in order to obtain various driving conditions for the transmission, including means for obtaining a condition wherein the shiftable clutch disconnects the driven member from both the ring gear and the planet gear carrier and the selector valve is arranged to direct fluid so that all the motor means are actuating their respective brake or clutch means to a disengaged condition in order to provide a neutral condition for the transmission.

5. In a transmission, the combination of a drive member, a driven member, a planetary gear set having a sun gear, a ring gear, a planet gear, and a planet gear carrier, means connecting the drive member with the sun gear, shiftable clutch means disconnectibly coupling the driven member with either the ring gear or the planet gear carrier, brake means engageable with the planet gear carrier for preventing rotation thereof, brake means engageable with the ring gear for preventing rotation thereof, friction clutch means for locking the planetary gear set so that the elements thereof rotate together as a unit, hydraulically operable motor means for each of said brake means and said clutch means for actuating the same to engagement or disengagement in response to fluid pressure, a source of fluid under pressure, a fluid conducting system including a selector valve arranged to selectively direct fluid from said source to any of said various motor means or to drain the same, a shifting mechanism connected with the shiftable clutch means and with the selector valve in such a way that movement of the shifting mechanism to various positions may obtain conditions whereby the shiftable clutch means may connect the driven member with either the ring gear or the planet carrier, or disconnect the driven member from both the ring gear and the planet carrier, and the selector valve may be set for directing fluid to any of the said motor means for controlling the engaging and disengaging of the brake means and the friction clutch means in order to obtain various driving conditions for the transmission, and means for obtaining a condition wherein the shiftable clutch means connects the driven member with the ring gear and the selector valve directs fluid so that the motor means for the ring gear brake means is actuated to engage condition in order to provide a brake for the driven member of the transmission.

6. In a transmission, the combination of a drive member, a driven member, a planetary gear set having a sun gear, a ring gear, a planet gear, and a planet gear carrier, means connecting the drive member with the sun gear, shiftable clutch means for disconnectibly coupling the driven member with either the ring gear or the planet gear carrier, a friction clutch means for locking the planetary gear set so that the elements thereof rotate together as a unit, a hydraulically operable motor means for actuating the friction clutch means to engagement in response to fluid pressure, brake means engageable with the planet gear carrier for preventing rotation thereof, a hydraulically operable motor means for actuating the planet gear carrier brake means to engagement in response to fluid pressure, brake means engageable with the ring gear for preventing rotation thereof, a hydraulically operable motor means for actuating the ring gear brake means to disengaged position, a continuously acting yieldable means for actuating the ring gear brake means to engaged position, a source of fluid pressure, a fluid conducting system communicating with said source and said various motor means, and a selector valve means in said system having at least three fluid delivery ports and also having drainage ports associated therewith and operable to connect any of said various motor means with the delivery ports or with the drainage ports.

7. In a transmission, the combination of a drive member, a driven member, driving means for drivably connecting the said drive and driven members and including a tooth type clutch means and a friction type clutch means so arranged that during normal operation of the transmission disengagement of either or both of the said clutch means will break the driving connection, a shift member movable to shift the said tooth clutch means into and out of engagement, a hydraulically operable motor means for actuating the friction clutch means into and out of engagement, a source of fluid under pressure, a fluid conducting system communicating with said source and with said motor means, valve means in said system and movable to a position that delivers fluid under pressure to said motor means to actuate said friction clutch means into engagement and movable to another position that relieves the fluid pressure thus delivered to disengage the friction clutch means, and control means for moving the valve means including a common actuator for moving both the shift member and the valve means, said actuator and shift member including a lost motion connection and being operable to complete the movement of the shift member and engage the tooth clutch means before the valve means is moved to the position that provides engagement of the friction clutch means.

8. In combination with an engine lubricating system having an engine driven pump for creating pressure on the lubricating fluid in the system, a transmission including a substantially closed housing, a drive member and a driven member in said housing, means for operatively connecting the drive member with the engine, means for disconnectibly operatively coupling the driven member with the drive member, a fluid operable motor for actuating said last means, means communicating with said lubricating system for delivering lubricating fluid under pressure for operating said motor and for supplying lubricating fluid to the interior of the transmission housing, a sump in the lower portion of the transmission housing for collecting lubricating fluid delivered to the housing, a drain trough located within the transmission housing above the level of the sump and alongside of one of said members, one or more paddle blades carried by said last mentioned member and adapted upon rotation thereof to splash the fluid from the sump to the drain trough, and means for returning the fluid collected by the drain trough to said lubricating system.

9. In combination with an engine lubricating system including a reservoir for lubricating fluid and a pump having its intake communicating with the reservoir and capable of delivering lubricating fluid under pressure through the system, a drive member, a driven member, change speed ratio means including a rotatable member for disengageably operatively coupling the driven member with the drive member, means for controlling the operation of said change speed ratio means and including a fluid operable motor, a housing for the change speed ratio means and including a lubricating fluid collecting sump, fluid conduit means for lubricating said change speed ratio means and communicating with the outlet of said pump to receive lubricating fluid and communicating with said sump to drain lubricating fluid thereinto, a second fluid conduit means for operating said fluid operable motor and communicating with the outlet of said pump to receive lubricating fluid therefrom for operating the motor and communicating with said sump to drain lubricating fluid thereinto, a drain trough located within and on a side wall portion of said housing and above the line of said sump and operable to collect fluid draining down the wall portion, said rotating member operable upon rotation to splash the fluid from the sump to the wall portion of the housing above the drain trough, and means communicating between the drain trough and the reservoir for completing a fluid circuit.

10. In a transmission mechanism, a planetary gear set including a sun gear element, a planet gear carrier element and an orbit gear element, an input portion for driving one of said elements, an output portion, selector means movable to at least two different positions to selectively operatively couple the output portion to either of the other two of said elements, two brakes, one for restraining rotation of each of said other two elements, a brake operating means for each of said brakes, control means operatively connected to said selector means and to each of said brake operating means and movable to and from a position in which it causes operative coupling of the output portion to one of said other two elements and also concurrently causes engagement of the brake which restrains rotation of said same element to which the output portion is coupled.

11. In a transmission mechanism, a planetary gear set including a sun gear element, a planet gear carrier element and an orbit gear element, an input portion for driving one of said elements, an output portion, selector means movable to at least two different positions to selectively operatively couple the output portion to either of the other two of said elements, two brakes, one for restraining rotation of each of said other two elements, a brake operating means for each of said brakes, control means operatively connected to said selector means and to each of said brake operating means and movable to at least two positions, in a first of which positions it causes operative coupling of the output portion to one of said other two elements and also causes engagement of the brake which restrains rotation of the other of said two elements, and in another of which positions it causes operative coupling of the output portion to the last-mentioned element and causes concurrent engagement of the brake which restrains rotation of the element to which the output portion is coupled.

12. In a transmission mechanism, a planetary gear set including a sun gear element, a planet gear carrier element and an orbit gear element, an input portion for driving one of said elements, an output portion, forward-reverse selector means movable to at least three different positions to selectively operatively couple the output portion to either of the other two of said elements or to disengage said output portion to establish a neutral condition, two brakes, one for restraining rotation of each of said other two elements, a brake operating means for each of said brakes, control means operatively connected to said selector means and to each of said brake operating means and movable to at least two positions in a first of which positions it causes operative coupling of the output portion to one of said other two elements and also causes engagement of the brake which restrains rotation of the other of said two elements, and in another of which positions it causes operative coupling of the output portion of the last-mentioned element and causes concurrent engagement of the brake which restrains rotation of the element to which the output portion is coupled, and means biasing said last-mentioned brake to engaged condition.

13. In a transmission mechanism, a panetary gear set including a sun gear element, a panet gear carrier element and an orbit gear element, an input portion for driving one of said elements, an output portion, forward-reverse selector means movable to at least three different positions to selectively operatively couple the output portion to either of the other two of said elements or to disengage said output portion to establish a neutral condition, two brakes, one for restraining rotation of each of said other two elements, a brake operating means for each of said brakes, control means operatively connected to said selector means and to each of said brake operating means and movable to at least two positions in a first of which positions it causes operative coupling of the output portion to one of said other two elements and also causes engagement of the brake which restrains rotation of the other of said two elements, and in another of which positions it causes operative coupling of the output portion to the last-mentioned element and causes engagement of the brake which restrains rotation of the element to which the output portion is coupled, means biasing said last-mentioned brake to engaged condition, releasable counterbiasing means operative to overcome said biasing means and cause release of said brake, and means responsive to rotation of the input portion for energizing said counterbiasing means.

14. In a transmission mechanism, a planetary gear set including a sun gear element, a planet gear carrier element and an orbit gear element, an input portion for driving one of said elements, an output portion, forward-reverse selector means movable to at least three different positions to selectively operatively couple the output portion to either of the other two of said elements or to disengage said output portion to establish a neutral condition, two brakes, one for restraining rotation of each of said other two elements, a brake operating means for each of said brakes, a direct drive clutch, control means operatively connected to said selector means and to each of said brake operating means and movable to at least three positions in a first of which positions it causes operative coupling of the output portion to one of said other two elements and also causes engagement of the brake which restrains rotation of the other of said two elements, in a second of which positions it engages said direct drive clutch, and in a third of which positions it causes operative coupling of the output portion to the last-mentioned element and causes engagement of the brake which restrains rotation of the element to which the output portion is coupled, means biasing said last-mentioned brake to engaged condition, releasable counterbiasing means operative to overcome said biasing means and cause release of said brake, and means responsive to rotation of the input portion for energizing said counterbiasing means.

15. In a transmission mechanism, a planetary gear set including a sun gear element, a planet gear carrier element and an orbit gear element, an input portion for driving one of said elements, an output portion, forward-reverse selector means movable to at least three different positions to selectively operatively couple the output portion to either of the other two of said elements or to disengage said output portion to establish a neutral condition, two brakes, one for restraining rotation of each of said other two elements, a brake operating means for each of said brakes, a direct drive clutch, control means operatively connected to said selector means and to each of said brake operating means and movable to at least three positions in a first of which positions it causes operative coupling of the output portion to one of said other two elements and also causes engagement of the brake which restrains rotation of the other of said two elements, in a second of which positions it engages said direct drive clutch, and in a third of which positions it causes operative coupling of the output portion to the last-mentioned element and causes engagement of the brake which restrains rotation of the element to which the output portion is coupled, means biasing said last-mentioned brake to engaged condition, and releasable counterbiasing means operative to overcome said biasing means and cause release of said brake, means responsive to rotation of the input portion for energizing said counterbiasing means, and means responsive to movement of the control means to a fourth position for disabling said counterbiasing means.

16. In a transmission mechanism, a planetary gear set including a sun gear element, a planet gear carrier element and an orbit gear element, an input portion for driving one of said elements, an output portion, forward-reverse selector means movable to at least three different positions to selectively operatively couple the output portion to either of the other two of said elements or to disengage said output portion to establish a neutral condition, two brakes, one for restraining rotation of each of said other two elements, a brake operating means for each of said brakes, control means operatively connected to said selector means and to each of said brake operating means and movable to at least two positions in a first of which positions it causes operative coupling of the output portion to one of said other two elements and also causes engagement of the brake which restrains rotation of the other of said two elements, and in another of which positions it causes operative coupling of the output portion to the last-mentioned element and causes engagement of the brake which restrains rotation of the element to which the output portion is coupled, means biasing said last-mentioned brake to engaged condition, and manually operable means for disabling said biasing means.

17. In a transmission mechanism, a planetary gear set including a sun gear element, a planet gear carrier element and an orbit gear element, an input portion for driving one of said elements, an output portion, forward-reverse selector means movable to at least three different positions to selectively operatively couple the output portion to either of the other two of said elements or to disengage said output portion to establish a neutral condition, two brakes, one for restraining rotation of each of said other two elements, a brake operating means for each of said brakes, a direct drive clutch, control means operatively connected to said selector means and to each of said brake operating means and movable to at least three positions in a first of which positions it causes operative coupling of the output portion to one of said other two elements and also causes engagement of the brake which restrains rotation of the other of said two elements, in a second of which positions it engages said direct drive clutch, and in a third of which positions it causes operative coupling of the output portion to the last-mentioned element and causes engagement of the brake which restrains rotation of the element to which the output portion is coupled, means biasing said last-mentioned brake to engaged condition, releasable counterbiasing means operative to overcome said biasing means and cause release of said brake, means responsive to rotation of the input portion for energizing said counterbiasing means, means responsive to movement of the control means to a fourth position for disabling said counterbiasing means, and manually operable means for disabling said biasing means.

18. In a transmission mechanism, a planetary gear set having a plurality of elements, an input portion for imparting a drive to one of said elements, a two-way-acting releasable friction-type reaction brake engageable to restrain rotation of another of said elements, an output portion, selector means movable to at least two different positions to selectively operatively couple the output portion to either said element with which said brake is engageable or to another of said elements, actuating means for said brake, a common controller operatively connected to the selector and to said actuating means and movable to at least three positions, in one of which positions it causes concurrent engagement of the brake and coupling of the output portion to said element with which the brake is engaged, and in another of which positions it causes release of the brake while the output portion is coupled to said same element.

19. In a transmission mechanism, a planetary gear set having a plurality of elements, an input portion for imparting a drive to one of said elements, a two-way acting releasable friction-type reaction brake engageable to restrain rotation of another of said elements, an output portion, selector means movable to at least two different positions to selectively operatively couple the output portion to either said element with which said brake is engageable or to another of said elements, actuating means for said brake, a common controller operatively connected to the selector and to said actuating means and movable to at least three positions, in one of which positions it causes concurrent engagement of the brake and coupling of the output portion to said element with which the brake is engaged, in another of which positions it causes release of the brake while the output portion is coupled to said same element, and in other of which positions it causes release of said brake while the output portion is coupled to another of said elements.

20. In a transmission mechanism, a planetary gear set having a plurality of elements, an input portion for imparting a drive to one of said elements, a two-way acting releasable friction-type reaction brake engageable to restrain rotation of another of said elements, an output portion, selector means movable to at least two different positions to selectively operatively couple the output portion to either said element with which said brake is engageable or to another of said elements, actuating means for said brake, a common controller operatively connected to the selector and to said actuating means and movable to at least three positions, in one of which positions it causes engagement of the brake and concurrent coupling of the output portion to said element with which the brake is engaged, in another of which positions it causes release of the brake while the output portion is coupled to said same element, in other of which positions it causes release of said brake while the output portion is coupled to another of said elements, and in another of which positions it causes engagement of said brake while the output portion is coupled to the last-mentioned element.

21. In a transmission, in combination with an input member, a planetary gear set and an output shaft, said planetary gear set including a sun gear, planetary gearing, a carrier for the planetary gearing, and an orbit gear, said output shaft extending to a position beside and being substantially coaxial with the planetary gear set, a pair of clutchable collar portions, one such collar portion being connected to the carrier and the other to the ring gear, said collar portions extending laterally and coaxially from the gear set in the direction of the output shaft, a clutch portion carried by each of said collars, said clutch portions being axially spaced from one another, and an axially shiftable clutch element carried by and keyed to the output shaft and selectively engageable with either of said clutch portions, a housing enclosing said transmission, an annular wall carried by said housing and extending rigidly therefrom in the opposite direction to the direction in which the collars extend, said wall being coaxial with and telescopically overlying said collars, and serving as a bearing support for the outer one of said collars, a brake drum secured to said orbit gear and extending in the same direction as, and radially outspaced from, said collars and from said annular wall, and braking means supported by the housing and engageable with said drum and also overlying said annular wall.

22. In a transmission, the combination of a drive member, a driven member, a planetary gear set having a sun gear, a ring gear, a planet gear, and a planet gear carrier, means connecting the drive member with the sun gear, a clutch element for the planet gear carrier, a clutch element for the ring gear, a clutch element for the driven member alternatively engageable with either the clutch element for the planet gear carrier or the clutch element for the ring gear, brake means engageable with the planet gear carrier for resisting rotation thereof, brake means engageable with the ring gear for resisting rotation thereof, two separate operating means for said last-mentioned brake means, one of said operating means being manually controllable, and acting only on said brake means, and the other of said operating means being interconnected with said clutch element for the driven member to also operate said clutch element.

23. In a transmission, the combination of a drive member, a driven member, a planetary gear set including a sun gear element, an orbit gear element and planetary gearing including a carrier element, means connecting the drive member with one of said elements, a clutch member for another of said elements, a clutch member for the driven member engageable with said first mentioned clutch member, brake means engageable with another of said elements for opposing rotation thereof, actuating means for causing engagement of the brake means, a controller for controlling the actuating means, a selecting device for effecting engagement of the clutch members, means operatively interconnecting and correlating the selecting device with the controller such that a movement of said controller first completely engages said clutch members and thereafter causes engagement of brake means, to establish a geared speed ratio for the transmission, and friction clutch means also operable by the controller for coupling together two of said elements to establish a direct drive.

24. In a transmission, the combination of a drive member, a driven member, a planetary gear set having a sun gear, a ring gear, a planet gear, and a planet gear carrier, means connecting the drive member with the sun gear, a clutch element for the planet gear carrier, a clutch element for the driven member engageable with the clutch element for the planet gear carrier, brake means engageable with the ring gear for preventing rotation of the ring gear, actuating means for causing engagement of said brake means, a controller for controlling the actuating means, a selecting device for controlling the engagement of the clutch elements, timing means associated with said selecting device and controller so that the clutch elements are completely engaged before the controller allows engagement of said brake means, and means associated with the controller and selecting device for obtaining a combination whereby the clutch element for the driven member is engaged with the clutch element for the ring gear and the brake means for the ring gear is engaged therewith thereby to provide a brake for the driven member while the drive member is freely rotatable, and separate manual means for disengaging the ring gear brake means.

25. In a transmission, the combination of a drive member, a driven member, a planetary gear set having a sun gear, a ring gear, a planet gear, and a planet gear carrier, means connecting the drive member with the sun gear, a clutch element for the planet gear carrier, a clutch element for the ring gear, a clutch element for the driven member alternatively engageable with either the clutch element for the planet gear carrier or the clutch element for the ring gear, brake means engageable with the planet gear carrier for resisting rotation thereof, brake means engageable with the ring gears for resisting rotation thereof, two separate operating means for said last-mentioned brake means, hydraulic means responsive to rotation of the drive member independently of the driven member for controlling one of said operating means, and the other of said operating means being interconnected with said clutch element for the driven member to also operate said clutch element.

References Cited in the file of this patent

UNITED STATES PATENTS

| Number | Name | Date |
|---|---|---|
| 436,072 | Baldwin | Sept. 9, 1890 |
| 888,594 | Davis | May 26, 1908 |
| 1,055,017 | Brush | Mar. 4, 1913 |
| 1,246,236 | Cooper | Nov. 13, 1917 |
| 1,857,365 | Dodge | May 10, 1932 |
| 1,986,045 | Clayton | Jan. 1, 1935 |
| 2,009,477 | Clayton | Jan. 30, 1935 |
| 2,011,101 | Dodge | Aug. 13, 1935 |
| 2,029,118 | Patterson | Jan. 28, 1936 |
| 2,045,611 | Padgett | June 30, 1936 |
| 2,077,580 | Patterson | Apr. 20, 1937 |
| 2,127,354 | Fishburn | Aug. 16, 1938 |
| 2,171,162 | Mitchell | Aug. 29, 1939 |
| 2,201,169 | Griswold | May 21, 1940 |
| 2,242,515 | Dodge | May 20, 1941 |
| 2,256,320 | Lapsky | Sept. 26, 1941 |
| 2,316,390 | Biermann | Apr. 13, 1943 |
| 2,324,713 | McFarland | July 20, 1943 |
| 2,343,955 | Cotterman | Mar. 14, 1944 |
| 2,373,122 | La Brie | Apr. 10, 1945 |
| 2,377,696 | Kelley | June 5, 1945 |
| 2,408,008 | Tipton | Sept. 24, 1946 |
| 2,408,336 | Orr | Sept. 24, 1946 |
| 2,413,675 | Baker | Jan. 7, 1947 |
| 2,422,933 | Small | June 24, 1947 |
| 2,471,669 | Baker | May 31, 1949 |
| 2,495,988 | Sheppard | Jan. 31, 1950 |
| 2,518,825 | Simpson | Aug. 15, 1950 |
| 2,541,391 | Weiss et al. | Feb. 13, 1951 |
| 2,564,466 | Clifton | Aug. 14, 1951 |
| 2,566,518 | Farkas | Sept. 4, 1951 |
| 2,582,487 | Kelbel | Jan. 15, 1952 |
| 2,584,965 | McFarland | Feb. 5, 1952 |
| 2,588,161 | Probst | Mar. 4, 1952 |
| 2,632,544 | Hockert | Mar. 24, 1953 |